United States Patent Office 3,457,245
Patented July 22, 1969

3,457,245
PROCESS FOR PREPARING CARBOXY TERMINATED COPOLYMERS
David E. Rice, Minneapolis, Minn., assignor to Minnesota Mining and Manufacturing Company, St. Paul, Minn., a corporation of Delaware
No Drawing. Filed Jan. 18, 1965, Ser. No. 426,404
Int. Cl. C08f 1/64, 15/06
U.S. Cl. 260—87.7    5 Claims

ABSTRACT OF THE DISCLOSURE

A process for preparing carboxyl terminated copolymers of vinylidene fluoride and perfluoropropene by employing novel peroxy-(omega-carboxyl perfluoro) acids, the latter being prepared by the reaction of a perfluoro cyclic dicarboxylic acid anhydride in solution with hydrogen peroxide.

---

This invention relates to a new and useful process for producing carboxyl terminated copolymers of vinylidene fluoride and perfluoropropene, to intermediate compounds useful in such process and to methods for making such intermediates.

In one aspect, this invention relates to a process for the preparation of carboxyl terminated copolymers of vinylidene fluoride and perfluoropropene which are characterized by the formula:

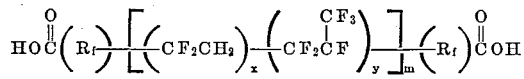

where:

$R_f$ is a perfluoroalkylene group containing from 1 through 15 carbon atoms, $m$ is a positive whole number of at least 5 and preferably less than 500 and more preferably less than 100, $x$ and $y$ are positive numbers, $y$ being 1, and the average ratio of $x$ to $y$ in a copolymer molecule is from about 1:1 to 5:1.

In another aspect this invention is directed to new peroxy-(omega-carboxyl perfluoro) acids which are useful intermediates in the manufacture of copolymers of vinylidene fluoride and perfluoropropene in accordance with the processes of this invention.

In another aspect this invention is directed to methods for making such peroxy acids.

Heretofore, so far as is known to us, there was described in the literature no process for attaching carboxyl terminal groups to copolymers of vinylidene fluoride and perfluoropropene in such a way that the carboxyl groups are spaced from the copolymer chain by a perfluoro alkylene moiety. By the present invention a method is provided for producing such carboxyl terminated copolymers.

Although the polymerization of a fluorinated olefin such as tetrafluoroethylene using peroxytrifluoroacetic acid as the initiator has been described in U.S. Patent No. 2,988,542, the products of that copolymerization reaction are not copolymers of vinylidene fluoride and perfluoropropene and, even more importantly, such product copolymers as are therein described contain no functional end groups as sites for chain extending and curing as, for example, for use in sealant compositions.

Also heretofore so far as is known to us, there were no peroxy-(omega-carboxyl perfluoro) acids known to the art which not only are useful in the processes of the present invention but also are useful as intermediates in the preparation of a plurality of other chemical compounds.

It is accordingly an object of the present invention to provide methods for the preparation of copolymers of vinylidene fluoride and perfluoropropene having carboxyl end groups.

Another object of this invention is to provide a new class of peroxy acids which are especially useful in practicing the processes of the present invention.

Another object of this invention is to provide methods for the manufacture of such peroxy acids.

Other and further objects of this invention will be apparent to those skilled in the art from a reading of the present specification and appended claims.

By the present invention copolymers of vinylidene fluoride and perfluoropropene are prepared by contacting a liquid mixture of these two monomers with peroxy-(omega-carboxyl perfluoro) acids. For example, vinylidene fluoride and perfluoropropene in the proportion required to obtain the ratio of $x$ to $y$ outlined above in Formula 1 are contacted with a fluorocarbon solution of a perfluoro cyclic dicarboxylic acid anhydride and hydrogen peroxide. The reaction is illustrated by the following equations:

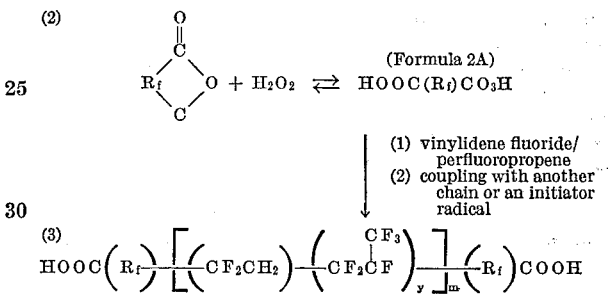

In Equations 2 and 3 above, $R_f$, $m$, $x$ and $y$ are as defined above in reference to Formula 1. The perfluoro cyclic di-carboxylic acid anhydride in Equation 2 above preferably has 2, 3, or 4 ($CF_2$) groups in the ring structure. The perfluorinated cyclic anhydrides can be prepared by any conventional means; see, for example, in U.S. Patent No. 2,502,478, or in JACS 74, 4520 (1952).

The peroxy-(omega-carboxyl perfluoro) acids can optionally be generated in the reaction mixture in situ by the reaction of Equation 2. Since the presence of water destroys the peroxy acid, it is preferred to employ a concentrated form of hydrogen peroxide (say, at least 60 percent and more preferably 70 to 90 percent aqueous solutions) and an excess of cyclic anhydride so that after the hydrogen peroxide has ruptured the anhydride ring, any water present will be taken up by the excess cyclic anhydride which produces a dicarboxylic acid that remains in solution and is non-reactive in the polymerization reaction.

Even relatively dilute aqueous solutions of hydrogen peroxide can be used, but it will be appreciated by those skilled in the art that when such dilute solutions are used, more cyclic anhydride will be used to take up the water present.

The compounds of Formula 2A tend to be rather inefficient from a quantitative viewpoint as initiators or catalysts for the polymerization reaction since only about 5 to 10 percent of such compounds appear as terminal end groups in the final product. This may be due to the fact that the peracid compounds of Formula 2A tend to be only slightly soluble in fluorocarbon solvents. Thus, it tends to be difficult to obtain an appreciable concentration of a compound of Formula 2A in the polymerization mixture. The use of solvents to solubilize Formula 2A compounds tends to result in inhibition of the polymerization, presumably due to chain transfer reactions. In general, the mole ratio of vinylidene fluoride to the peroxy acid of Formula 1 can range from 1:1 to 50:1.

The yield of polymer is dependent upon the ratio of vinylidene fluoride to perfluoropropene. With a large excess of perfluoropropene, the high yields of polymer are obtained while with mole ratios of 1:1, low yields are obtained. It is, therefore, preferred to maintain the ratio of perfluoropropene to vinylidene fluoride in the range of from about 1:1 to 25:1.

In general, the yield obtained and the molecular weight of the product appears to be more or less independent of the particular cyclic anhydride used.

The Formula 2A compounds are particularly useful in practicing this invention where a large excess of perfluoropropene is employed, that is, in polymerizations designed to give a polymer containing close to 50 mole percent of perfluoropropene at medium to high molecular weight (i.e. say up to molecular weights of about 50,000).

Polymers of lower molecular weights (say 15,000 to 20,000) generally require larger quantities of anhydride than do polymers of higher molecular weight.

The reaction temperature employed in carrying out the processes of this invention is found to be important. Temperatures of about 20° C. are preferred. With temperatures below, say, 5° C. little reaction occurs. At temperatures above, say 35° C., decreased yields of polymer result. Preferably autogenous pressures are employed.

The fact that the copolymers produced by the processes of the present invention appear to be substantially all carboxyl terminated is readily demonstrated, for example, by infrared analysis and by the fact that the product copolymers are readily cross linked by reaction with $Cr(OCOCF_3)_3$.

The Formula 2A compounds tend to be unstable and difficult to isolate. It is, therefore, preferred to store them in fluorocarbon liquid media using temperatures below −20° C. and preferably lower than −50° C. In addition to being useful in the manufacture of copolymers in accordance with the teachings of this invention, these compounds are useful as intermediates in the preparation of a wide variety of organic compounds.

The copolymeric products of the process of this invention are useful in sealant and caulking compositions.

The following examples are offered as a better understanding of the present invention. The following procedure is used in all examples:

Examples 1–9

A 60 cubic centimeter Pyrex ampoule is cooled to −78° C. and charged with the solvent (if any), the fluorinated anhydride and aqueous hydrogen peroxide. The ampoule is then cooled in liquid nitrogen and the monomers condensed in from a gas transfer system. After sealing, the tube is warmed to 20° C. and shaken for a few minutes. This usually causes precipitation of the fluorocarbon diacid (and probably some of the peracid). The ampoule is then allowed to stand in a water bath at the desired temperature. Agitation throughout the reaction period appears to have no effect on the polymerization. The polymer is worked up by venting the excess monomers, distilling off the solvent (if any) and washing the polymer several times with hot water. In some cases, further purification is effected by dissolving the polymer in xylene hexafluoride and adding the solution to several volumes of water with vigorous stirring. Final drying of the polymers is done at 80° C. at 15 millimeters Hg pressure. The experimental data are summarized in Table I below.

TABLE I.—PREPARATION OF COOH TERMINATED $VF_2/C_3F_6$ COPOLYMERS USING CYCLIC ANHYDRIDES/$H_2O_2$ AS INITIATORS

| Ex. No. | Anhydride used | Anhydride (g.) | $H_2O_2$ (g.)[1] | Solvent | $C_3F_6/VF_2$ (g.) | Temp., °C. | Rx. time, hours | Yield (g.) | Comments |
|---|---|---|---|---|---|---|---|---|---|
| 1 | $(CF_2)_4$ cyclic anhydride 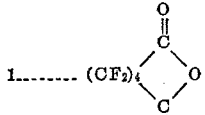 | 1.1 | .64 | 5 cc. FC-75.[2] | 3.5/1.5 | 23 | 60 | 1.1 | Product was a soft elastomeric gum. |
| 2 | $(CF_2)_2$ cyclic anhydride 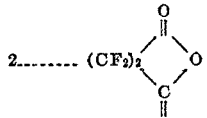 | 0.69 | .64 | 5 cc. FC-75.[2] | 3.5/1.5 | 40 | 16 | 0.6 | Do. |
| 3 | Same as above | 0.34 | 0.034 | | 15/0.7 | 23 | 16 | 1.8 | $(\eta)=0.17$, sample could be cured with $Cr(OCOCF_3)_3$. |
| 4 | $(CF_2)_3$ cyclic anhydride 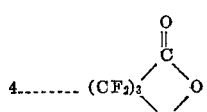 | 0.88 | 0.034 | | 17.5/0.7 | 20 | 16 | 2.2 | $(\eta)=.097$, elemental analysis indicated 46 mol percent $C_3F_6$. |
| 5 | Same as above | 1.76 | 0.14 | | 17.5/0.7 | 20 | 16 | 2.1 | $(\eta)=.063$. |
| 6 | do | 17.7 | 1.4 | 20 cc. FC-75.[2] | 150/~12 | 18–25 | 48 | 43 | Run in 300 cc. Aminco bomb. $VF_2$ charged by "demand feed technique" at 100 p.s.i., $<\eta>=0.14$ equivalent weight by titration of acid groups: 9,800. |
| 7 | do | 0.88 | 0.068 | 10 vv. FC-75.[2] | 17.5/0.7 | 23 | 16 | 0.8 | |
| 8 | do | 0.88 | 0.068 | 10 cc. $CF_2Cl$-$CFCl_2$ | 17.5/0.7 | 23 | 16 | 1.2 | |
| 9 | do | 0.88 | 0.068 | 10 cc.[2] | 17.5/0.7 | 23 | 16 | 1.0 | |

[1] 70–90 percent solutions of $H_2O_2$ are used. The weights given are corrected to 100 percent $H_2O_2$.
[2] FC-75 is a product designation of a fluorocarbon liquid available from the 3M Company primarily consisting of a cycle $C_8F_{16}O$ mixture boiling at about 100° C.
[3] The solvent here is perfluorotributyl amine.

Example 10

1.76 grams of the anhydride:

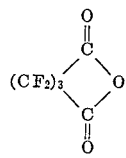

are dissolved in FC–75 (a product designation of a fluorocarbon liquid available from the 3M Company primarily consisting of a cyclic $C_8F_{16}O$ mixture boiling at about 100° C.) is cooled to −50° C. Next 0.20 gram of 70 percent hydrogen peroxide is added slowly thereto. Titration of the product solution by the method of Silbert and Swern (Analytical Chemistry, 30, 385 (1958) ) indicates a quantitative conversion to the peroxyacid. The resulting solution is allowed to stand overnight at the same temperature. This solution is then charged into an ampoule with 17.5 grams of perfluoropropene and 0.7 gram vinylidene fluoride. The ampoule is sealed and maintained at 20° C. for 16 hours. Thereafter the ampoule is opened and the reaction mixture is worked up as described in Examples 1 through 9. The results indicate that a yield of about 2.1 grams of vinylidene fluoride/perfluoropropene copolymer having an inherent viscosity of about .06 is obtained. The presence of carboxyl end groups in this copolymer is demonstrated by its infrared spectrum.

The claims are:
1. A process for preparing carboxy terminated copolymers of vinylidene fluoride and perfluoropropene comprising contacting a liquid mixture of vinylidene fluoride and perfluoropropene with a mixture of (a) perfluorocyclic dicarboxylic acid anhydride and (b) hydrogen peroxide until the desired copolymer results.

2. A process for preparing carboxy terminated copolymers of vinylidene fluoride and perfluoropropene comprising the step of admixing with a liquid mixture of vinylidene fluoride and perfluoropropene a mixture of (a) a perfluorocyclic dicarboxylic acid anhydride of the formula

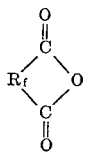

where $R_f$ is a perfluoroalkylene group of 1 to about 15 carbon atoms and (b) hydrogen peroxide until the desired copolymer results.

3. The process of claim 2 wherein said anhydride has the structural formula

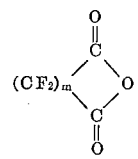

wherein $m$ is an integer from 2 to 4 inclusive.

4. A process for preparing carboxy terminated copolymers of vinylidene fluoride and perfluoropropene comprising contacting in a temperature range of from about 5 to 35° C. a liquid mixture of perfluoropropene and vinylidene fluoride in a mole ratio of at least 1:1 with a mixture of (a) hydrogen peroxide and (b) a cyclic anhydride of the formula

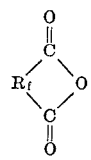

where $R_f$ is a perfluoroalkylene group of 1 to about 15 carbon atoms, the mole ratio of vinylidene fluoride to said anhydride being from about 1:1 to 25:1.

5. A process for preparing carboxy terminated copolymers of vinylidene fluoride and perfluoropropene comprising contacting
(a) an inert liquid fluorocarbon solution containing hydrogen peroxide and a cyclic anhydride of the formula

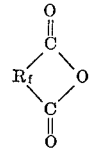

where $R_f$ is a perfluoroalkylene group of 1 to about 15 carbon atoms with
(b) a liquid mixture of perfluoropropene and vinylidene fluoride in a mole ratio of at least 1:1, respectively, the mole ratio of vinylidene fluoride to cyclic anhydride being from about 1:1 to about 50:1, respectively.

References Cited
UNITED STATES PATENTS 2,988,542    6/1961    Bio et al. _____ 260—87.5

JAMES A. SEIDLECK, Primary Examiner
JOHN A. DONAHUE Jr., Assistant Examiner

U.S. Cl. X.R.
260—78.4, 502

PO-1050
(5/69)

UNITED STATES PATENT OFFICE
CERTIFICATE OF CORRECTION

Patent No. 3,457,245          Dated July 22, 1969

Inventor(s) David E. Rice

It is certified that error appears in the above-identified patent and that said Letters Patent are hereby corrected as shown below:

Column 2, line 32, that portion of the formula reading "$\text{-(CF}_2\text{CH}_2\text{)-}$" should read -- $\text{-(CF}_2\text{CH}_2\text{)}_x$ --. Column 3, Table 1, Example No. 7, that portion reading "10 vv." should read -- 10 cc. --. Column 3, Table 1, Example No. 9, that portion reading "10 cc.$^2$" should read -- 10 cc.$^3$ --.

SIGNED AND
SEALED
APR 28 1970

(SEAL)
Attest:

Edward M. Fletcher, Jr.
Attesting Officer

WILLIAM E. SCHUYLER, JR.
Commissioner of Patents